United States Patent [19]
Gauthier et al.

[11] Patent Number: 6,034,012
[45] Date of Patent: *Mar. 7, 2000

[54] COMPOSITE MATERIAL CONTAINING A FIBRE REINFORCED VITROCERAMIC MATRIX AND A METHOD OF MAKING THE SAME

[75] Inventors: Gérard Philippe Gauthier, St. Michel/Orge; Yves Emile Marie Ange Laurent, Thorigne Fouillard; Susanne Obradovic, Massy; Olivier Henri Sudre, Arcueil; Patrick Victor Auguste Verdier, Acigne, all of France

[73] Assignees: Societe National D'Etude Et De Construction De Moteurs D'Aviation (SNECMA), Paris; Office National D'Etudes Et De Recherches Aerospatiales (ONERA), Chatillon, both of France

[*] Notice: This patent issued on a continued prosecution application filed under 37 CFR 1.53(d), and is subject to the twenty year patent term provisions of 35 U.S.C. 154(a)(2).

[21] Appl. No.: 08/895,885

[22] Filed: Jul. 17, 1997

[30] Foreign Application Priority Data

Jul. 18, 1996 [FR] France .................................. 96.08990

[51] Int. Cl.$^7$ .......................... C03C 10/06; C03C 14/00
[52] U.S. Cl. .................................. 501/8; 501/32; 65/33.7
[58] Field of Search ................................ 501/8, 32, 95.2; 65/33.7

[56] References Cited

U.S. PATENT DOCUMENTS

| | | | |
|---|---|---|---|
| 4,615,987 | 10/1986 | Chyung et al. | 501/8 |
| 5,175,130 | 12/1992 | Kondo et al. | 501/8 |
| 5,214,004 | 5/1993 | Bansal | 501/8 |
| 5,281,559 | 1/1994 | Bansal | 501/8 |
| 5,448,041 | 9/1995 | Benoit et al. | 219/768 |
| 5,538,925 | 7/1996 | Talmy et al. | 501/8 |
| 5,578,534 | 11/1996 | Talmy et al. | 501/8 |

FOREIGN PATENT DOCUMENTS

| | | |
|---|---|---|
| 0 198 977 | 10/1986 | European Pat. Off. . |
| 0 416 723 | 3/1991 | European Pat. Off. . |

OTHER PUBLICATIONS

El–Shennawi, et al., "The Crystallisation of Celsian Polymorphs in Some Alkaline Earth Aluminosilicate Glasses", Glass Technology, vol. 32, No. 4, Aug. 1, 1991, pp. 131–137.

*Primary Examiner*—Karl Group
*Attorney, Agent, or Firm*—Oblon, Spivak, McClelland, Maier & Neustadt, P.C.

[57] ABSTRACT

Composite material comprising a CAS+BAS vitroceramic matrix reinforced with SiC fibers and exhibiting a small difference between the thermal expansion coefficients of the matrix and the fibers is obtained by using a matrix having a BaO/(BaO+CaO) molar ratio of between 25% and 55% and predominant phases of triclinic anorthite and monoclinic celsian.

17 Claims, No Drawings

COMPOSITE MATERIAL CONTAINING A FIBRE REINFORCED VITROCERAMIC MATRIX AND A METHOD OF MAKING THE SAME

BACKGROUND OF THE INVENTION

FIELD OF THE INVENTION

The invention relates to composite materials and methods of making such materials, and in particular, relates to materials having a vitroceramic matrix reinforced with fibres or monocrystalline short fibre trichites.

DESCRIPTION OF THE BACKGROUND

Vitroceramics are valued in industry, especially in aeronautics, for forming refractory composite materials. Such materials consist of reinforcing fibres, for example made of silicon carbide SiC or boron carbide $B_4C$, embedded in a vitroceramic matrix such as the alumino-silicate of lithium LAS ($LiO_2$—$Al_2O_3$—$SiO_2$), of magnesium MAS (MgO—$Al_2O_3$—$SiO_2$), of barium and magnesium BMAS (BaO—MgO—$Al_2O_3$—$SiO_2$), of calcium CAS (CaO—$Al_2O_3$—$SiO_2$), or of barium BAS (BaO—$Al_2O_3$—$SiO_2$) They exhibit a good suitability for densification by viscous flow in the glass state between the reinforcing fibres and the possibility of crystallizing subsequently makes it possible to increase the mechanical strength and the temperature behaviour.

The reinforcements are usually in the form of long fibres based on silicon carbide SiC or of mono crystalline short fibres called "trichites", which are also silicon carbide SiC based, or they may be in the form of fibres whose composition contains chemical elements selected from the following group: Si, C, B, O, N.

It is known that the presence of reinforcing fibres imparts a non-brittle fracture to the composite material. Nevertheless, the mechanical characteristics of the composite (breaking stress, matrix cracking stress, etc.) depend largely on the residual stresses of thermal origin. Consequently the difference in the thermal expansion coefficients between the fibre and matrix is an essential parameter in controlling the properties of the material. For example, silicon carbide SiC based trichites have a thermal expansion coefficient $\alpha$ ranging from $3.5\times10^{-6}/°$ C. in the case of fibres of the "Nicalon" type ("Nicalon" being a registered trademark of the company Nippon Carbon) to $4.3\times10^{-6}/°$ C. in the case of $\beta$ phase SiC trichites, whereas, for example, BAS in the hexacelsian crystalline form has a coefficient $\alpha=8\times10^{-6}/°$ C. and CAS in the anorthite crystalline form has a coefficient $\alpha=4.5\times10^{-6}/°$ C.

A first problem to be solved therefore is to reduce and to suitably modify the difference between the thermal expansion coefficients $\alpha$ of the vitroceramic matrix and of the fibre in such a composite material.

From the paper entitled "Crystallization Behaviour and Properties of $BaO.Al_2O_3.2SiO_2$ Glass Matrices", published in Ceramic Engineering and Science Proceedings Vol. 11 No. 7.8.1990, it is known that BAS in the monoclinic celsian crystalline form has a thermal expansion coefficient $\alpha=2.3\times10^{-6}/°$ C., as well as excellent stability up to 1590° C. Unfortunately, it is the hexacelsian form that appears as a matter of precedence upon crystallization. The hexacelsian form cannot be used because of its high expansion coefficient $\alpha=8\times10^{-6}/°$ C. and its tendency to change, on cooling, to an orthorhombic structure with an increase in volume of the order of 3%, which creates unacceptable internal stresses in the material.

A second problem to be solved therefore is to avoid the presence of hexacelsian, or its derivative with orthorhombic structure, in a matrix containing BAS.

It is also known that a minor presence of calcium oxide CaO or of calcium carbonate $CaCO_3$, relative to the BaO, promotes the formation of the celsian in a BAS matrix, but without preventing the intermediate formation of hexacelsian with the disadvantages listed above. It is consequently difficult to control the proportion of celsian which is formed in a BAS-based matrix and thereby difficult to control the thermal expansion coefficient of such a matrix.

A third problem therefore is to obtain a material with stable characteristics which are not subject to dispersion in manufacture as a result of the crystallization process.

A general process for the production of materials with a vitroceramic matrix is known, comprising essentially the following operations:

a) fine grinding and mixing of the constituents in the form of oxides or carbonates, b) melting of the glass and quenching with water, c) fine grinding and suspending the powder in a binder, d) coating the fibres with the powder by dipping and reeling, e) making up a preform of the article by assembling sheets of fibres, f) densifying by heating the preform to a temperature which is sufficient to bring the glass to a pasty state and pressing the preform, for example in a press-oven, g) nucleation, by maintaining the temperature of the material, and h) crystal growth by holding the material at a higher temperature.

Since vitroceramics, in particular the BAS and CAS compositions, are refractory materials and since a composite material which has a minimum porosity is desired, the steps f, g and h of the known process are normally performed at elevated temperatures for a period that can be considerable, and this causes a deterioration of the fibres and an alteration of the interfacial region in contact with the fibre, which can reduce the strength of the composite material.

A fourth problem is, therefore, to lower the temperature of manufacture of the composite material and/or shorten the period for which the material is maintained at these excessively high temperatures, in order to reduce the deterioration of the fibres while producing a material of low porosity.

EP 0198977 which claims priority from U.S. patent application Ser. No. 723,572 dated Apr. 15th 1985 discloses a composite material with a vitroceramic matrix comprising CAS and BAS and reinforced with silicon carbide SiC fibres. According to columns 8, 9 and 10 of Table 1, the thermal expansion coefficient a of the matrix remains substantially constant and close to $4.5\times10^{-6}/°$ C. for different proportions of calcium and barium oxides CaO and BaO, the barium being in a minority in terms of the number of atoms. As disclosed, this material does not solve the aforementioned problems.

SUMMARY OF THE INVENTION

The invention provides a refractory composite material comprising a vitroceramic matrix containing reinforcing fibres, which may be of the "trichite" type, based on a material selected from silicon carbide SiC and compositions containing elements selected from the group Si, B, O, N, C, the matrix being composed essentially of calcium aluminosilicate CAS in the triclinic anorthite form and barium aluminosilicate BAS in the monoclinic celsian form, with a BaO/(BaO+CaO) molar ratio of between 25% and 55%. In such a material the matrix has a thermal expansion coefficient a which varies from $4.2 \times 10^{-6}/°$ C. to $3.5 \times 10^{-6}/°$ C. as a function of the BaO/(BaO+CaO) molar ratio, and a person skilled in the art can adjust the expansion coefficient of the matrix by means of this ratio to make the said expansion coefficient compatible with that of the fibre employed.

DESCRIPTION OF THE PREFERRED EMBODIMENTS

In a first embodiment of the invention the matrix of the composite material has a BaO/(BaO+CaO) molar ratio of between 25% and 35% and consequently has a thermal expansion coefficient between $4.2 \times 10^{-6}/°$ C. and $4 \times 10^{-6}/°$ C. Such a composite material may be manufactured by the method generally described earlier, but wherein the matrix material is formed using oxides of Ca, Ba, Al and Si mixed in the following proportions by mass:

| | |
|---|---|
| CaO | from 7% to 19% |
| BaO | from 8% to 23% |
| $Al_2O_3$ | from 14.5% to 45% |
| $SiO_2$ | from 34% to 52% | and wherein the mass ratio BaO/(CaO+BaO) is from 47% to 60%.

The densification and nucleation steps will preferably be carried out at a temperature between 800° C. and 1000° C., which makes it possible to reduce the degradation of the fibres or trichites and of the interfacial region in the vicinity of the said fibres or trichites. A pressure of from 1 MPa to 10 MPa, depending on the temperature employed, is sufficient to achieve the densification of the matrix.

Preferably the step of crystal growth will also be carried out at a relatively low temperature of between 1100° C. and 1400° C.

In a second embodiment of the invention the BaO/(BaO+CaO) molar ratio of the matrix material is between 35% and 55%, and the material has a thermal expansion coefficient α between $4 \times 10^{-6}/°$ C. and $3.5 \times 10^{-6}/°$ C.

In this case the composite material may be manufactured as in the first embodiment, except that the matrix is formed using oxides of Ca, Ba, Al and Si mixed in the following proportions by mass:

| | |
|---|---|
| CaO | from 5.2% to 15.5% |
| BaO | from 11.5% to 33.2% |
| $Al_2O_3$ | from 13.4% to 43.5% |
| $SiO_2$ | from 31.5% to 50.9% | wherein the mass ratio BaO/(CaO+BaO) is from 60% to 77%, and the crystal growth step is extended by an annealing performed at a temperature of from 1100° C. to 1500° C. for a period which is at least equal to a value given by the following experimental formula:

$$t \geq 10^{(9.5 - 0.0066\, T)}$$

where t=annealing period expressed in hours,
and T=annealing temperature expressed in ° C.

In all cases from 1 to 4% of zirconium oxide $ZrO_2$ may advantageously be added to homogenize the nucleation and thereby the size of the grains in the matrix.

It is to be understood that in a composite material in accordance with the invention the thermal expansion coefficient of the matrix material can be adapted to that of the fibre by adjusting the respective proportions of BAS in the predominant monoclinic celsian form, of which the thermal expansion coefficient α is equal to $2.3 \times 10^{-6}/°$ C., and of CAS in the predominant triclinic anorthite form, of which the thermal expansion coefficient α is equal to $4.5 \times 10^{-6}/°$ C. An X-ray diffraction analysis has shown that hexacelsian or BAS in its orthorhombic form is absent in the material, at least in proportions that can be detected with this process. Thus the anorthite in a large quantity fulfils two functions in this material:

increasing the thermal expansion coefficient of the said material, and promoting the formation of monoclinic celsian and preventing the presence of hexacelsian or of orthorhombic BAS.

With a BaO/(BaO+CaO) molar ratio lower than 35%, the mere presence of triclinic anorthite CAS as the predominant component is sufficient to prevent the appearance of hexacelsian.

With a BaO/(BaO+CaO) molar ratio higher than 35%, the appearance of hexacelsian has been detected at the end of the crystallization stage. This hexacelsian is completely detectable by X-ray diffraction and produces a rise in the thermal expansion coefficient α of the matrix material. It has been found, however, that an annealing or extension of the duration of the crystallization stage makes it possible to convert this hexacelsian to monoclinic celsian with, at worst, a residue of hexacelsian which is not detectable by X-ray diffraction.

A first advantage of the invention is that it makes it possible to control the matching between the thermal expansion coefficients of the matrix material and of the fibre. A person skilled in the art can, in fact, easily determine, by a few experiments, the optimum mass ratio which gives the most appropriate matching, that is with a thermal expansion coefficient a of the matrix material slightly higher, equal to, or slightly lower than that of the fibre, depending on the effect being sought, such as the presence or absence of internal prestresses when cold and the location of these prestresses in the fibre or in the matrix. When this optimum mass ratio has been established, the composite material can be reproduced easily with the same characteristics merely by using appropriate measures of calcium oxide CaO and barium oxide BaO.

Another advantage of the invention is that it makes it possible to match the thermal expansion coefficients α suitably between fibre and matrix in the case of virtually all of the commercially available SiC fibres, whose thermal expansion coefficients usually vary from $3.5 \times 10^{-6}/°$ C. to $4.3 \times 10^{-6}/°$ C.

A further advantage of the invention is that the composite material, at least in the case of the lowest BaO/(BaO+CaO) mass ratios, can be made using a method which does not require elevated temperatures for a long period of time, thus enabling the deterioration of the fibres and of the interfacial region in the vicinity of the said fibres to be minimized.

In a first embodiment of the invention the matrix of the composite material is formed using the following oxides mixed in the stated proportions, by mass:

| | |
|---|---|
| CaO | 10.21% |
| BaO | 14.43% |
| Al$_2$O$_3$ | 36.10% |
| SiO$_2$ | 39.25% |
| ZrO$_2$ | +4% added, | thereby giving a BaO/(BaO+CaO) ratio of 0.58 on a mass basis, or 0.33 on a molar basis.

The method of making the composite material is as described earlier, observing the following conditions:

increasing the temperature of the preform under vacuum by 10° C./minute with a sufficient plateau at 350° C. to pyrolyse the organic binders, then increasing the temperature by 10° C./minute to 930° C. with introduction of nitrogen at a pressure of approximately 0.1 MPa, that is approximately 1 bar at about 600° C., densification and nucleation at a temperature of 930° C. at a pressure of 8 MPa for one hour, increasing the temperature by 10° C./minute up to 1350° C. and holding this temperature to complete the crystallization of the matrix.

The matrix material obtained under these conditions has a thermal expansion coefficient $\alpha$ equal to $4.05\times10^{-6}/°$ C. An X-ray diffraction analysis has shown that the matrix is free from hexacelsian. In general, the absence of hexacelsian has been observed for all BaO/(BaO+CaO) molar ratios lower than 0.35.

In a second embodiment of the invention the matrix components are mixed in the following proportions by mass:

| | |
|---|---|
| CaO | 8.92% |
| BaO | 20.17% |
| Al$_2$O$_3$ | 33.78% |
| SiO$_2$ | 37.13% |
| ZrO$_2$ | +3% added, | thereby giving a BaO/(BaO+CaO) ratio of 0.69 on a mass basis, or 0.45 on a molar basis.

A composite material is then made using the same method as in the first embodiment. The thermal expansion coefficient $\alpha$ of the material is equal to $4.8\times10^{-6}/°$ C. and an X-ray diffraction analysis has shown a strong presence of hexacelsian. This hexacelsian is then converted to celsian by a supplementary annealing operation at 1450° C. for one hour. An X-ray diffraction analysis then shows a predominant celsian phase and the absence of hexacelsian, at least in proportions which are detectable by this method of analysis after annealing.

It will be noted that the nucleation and crystal growth steps are performed in a press-furnace, but that the supplementary annealing step may be performed in an ordinary furnace.

The present invention should not be confused with EP 0198977 mentioned earlier as part of the state of the art. This patent does not suggest:

a) the presence of triclinic anorthite and monoclinic celsian predominant phases with the absence of hexacelsian in a BaO/(BaO+CaO) molar ratio range extending from 25% to 55%, with a thermal expansion coefficient $\alpha$ between $4.2\times10^{-6}/°$ C. and $3.5\times10^{-6}/°$ C. adjustable by controlling the amounts of the components BaO and CaO, b) the existence of a range of BaO/(Bao+CaO) molar ratios of between 25% and 35%, in which the thermal expansion coefficient $\alpha$ is lowered towards $4\times10^{-6}/°$ C., and, c) the existence of a BaO/(BaO+CaO) molar ratio range of between 35% and 55% with a thermal expansion coefficient which is lowered and adjustable in the same conditions, the thermal expansion coefficients which are much higher in the case of the materials disclosed in columns two and three of Table 1 of EP 0198977 revealing a strong presence of hexacelsian in this molar ratio range, in contrast to the material of the present invention.

We claim:

1. A composite material, consisting essentially of reinforcing fibres in a vitroceramic matrix, which vitroceramic matrix consists essentially of triclinic anorthite and monoclinic celsian, and wherein:

a) said reinforcing fibres are based on a compound containing an element selected from the group consisting of Si, B, O, N, and C; and b) said vitroceramic matrix consisting essentially of aluminosilicates of calcium and barium having a BaO/(BaO+CaO) molar ratio of between about 25 and 55%.

2. The composite material of claim 1, wherein said BaO/(BaO+CaO) molar ratio is between about 25 and 35%, which corresponds to a mass ratio of about 47 to 60%, and wherein a thermal expansion coefficient, $\alpha$, of said vitroceramic matrix material is between about $4.2\times10^{-6}/°$ C. and $4\times10^{-6}/°$ C.

3. The composite material of claim 1, wherein said BaO/(BaO+CaO) molar ratio is between about 35 and 55%, which corresponds to a mass ratio of about 60 to 77%, and wherein the thermal expansion coefficient, $\alpha$, of said vitroceramic matrix material is between about $4\times10^{-6}/°$ C. and $3.5\times10^{-6}/°$ C.

4. The composite material of claim 2, wherein said vitroceramic matrix consists essentially of

| | |
|---|---|
| CaO | from 7% to 19% |
| BaO | from 8% to 23% |
| Al$_2$O$_3$ | from 14.5% to 45% |
| SiO$_2$ | from 34% to 52%. |

5. The composite material of claim 3, wherein said vitro ceramic matrix consists essentially of

| | |
|---|---|
| CaO | from 5.2% to 15.5% |
| BaO | from 11.5% to 33.2% |
| Al$_2$O$_3$ | from 13.4% to 43.5% |
| SiO$_2$ | from 31.5% to 50.9%. |

6. The composite material of claim 4, wherein said vitroceramic matrix consist essentially of

| | |
|---|---|
| CaO | 10.21% |
| BaO | 14.43% |
| Al$_2$O$_3$ | 36.10% |

-continued

| | |
|---|---|
| SiO$_2$ | 39.25% |
| ZrO$_2$ | 4% | wherein BaO/(BaO+CaO) ratio is 0.58 on a mass basis, and 0.33 on a molar basis.

7. The composite material of claim 5, wherein said vitroceramic matrix consists essentially of

| | |
|---|---|
| CaO | 8.92% |
| BaO | 20.17% |
| Al$_2$O$_3$ | 33.78% |
| SiO$_2$ | 37.13% |
| ZrO$_2$ | 3% | wherein a BaO/(BaO+CaO) ratio is 0.69 on a mass basis, and 0.45 on a molar basis.

8. The composite material of claim 1, which is free of hexacelsian.

9. A method of making the composite material of claim 2, which comprises:

a) grinding and mixing oxides of Ca, Ba, Al and Si in the following proportions by mass:

| | |
|---|---|
| CaO | from 7% to 19% |
| BaO | from 8% to 23% |
| Al$_2$O$_3$ | from 14.5% to 45% |
| SiO$_2$ | from 34% to 52% | wherein the mass ratio BaO/(BaO+CaO) is from 47% to 60%;

b) melting the ground and mixed oxides;

c) quenching the melt produced in step b);

d) finely grinding the quenched melt;

e) suspending the finely ground material produced in step d) in a binder;

f) coating fibers based on a compound containing an element selected from the group consisting of Si, B, O, N, and C, with the suspension produced in step e);

g) preparing a preform with the coated fibers of step f);

h) densifying said preform by heating and compressing said preform;

i) promoting nucleation in the material produced in step h); and j) promoting crystal growth in the material produced in step i).

10. The method of claim 9, wherein said densification step (h) is performed starting at a temperature of about 800° C.

11. The method of claim 9, wherein said nucleation step (i) is performed at a temperature of between about 800° C. and 1000° C.

12. The method of claim 9, wherein said crystal growth step (j) is performed at a temperature of between about 1100° C. and 1400° C.

13. A method of making the composite material of claim 3, which comprises:

a) grinding and mixing oxides of Ca, Ba, Al and Si in the following proportions by mass:

| | |
|---|---|
| CaO | from 5.2% to 15.5% |
| BaO | from 11.5% to 33.2% |
| Al$_2$O$_3$ | from 13.4% to 43.5% |
| SiO$_2$ | from 35.5% to 50.9% | wherein the mass ratio BaO/(BaO+CaO) is from 60% to 77%;

b) melting the ground and mixed oxides;

c) quenching the melt produced in step b);

d) finely grinding the quenched melt;

e) suspending the finely ground material produced in step d) in a binder;

f) coating fibers based on a compound containing an element selected from the group consisting of Si, B, O, N, and C, with the suspension produced in step e);

g) preparing a preform with the coated fibers of step f);

h) densifying said preform by heating and compressing said preform;

i) promoting nucleation in the material produced in step h); and j) promoting crystal growth in the material produced in step i).

14. The method of claim 13, wherein said densification step (h) is performed starting from a temperature of about 800° C.

15. The method of claim 13, wherein said nucleation step (i) is performed at a temperature of between about 800° C. and 1000° C.

16. The method of claim 13, wherein said crystal growth step (i) is performed at a temperature of between about 1100° C. and 1400° C.

17. A method of making the composite material of claim 1, which comprises:

a) grinding and mixing oxides of Ca, Ba, Al and Si;

b) melting the ground and mixed oxides;

c) quenching the melt produced in step b);

d) finely grinding the quenched melt;

e) suspending the finely ground material produced in step d) in a binder;

f) coating fibers based on a compound containing an element selected from the group consisting of Si, B, O, N, and C, with the suspension produced in step e);

g) preparing a preform with the coated fibers of step f);

h) densifying said preform by heating and compressing said preform;

i) promoting nucleation in the material produced in step h);

j) promoting crystal growth in the material produced in step i); and wherein said composite material produced consists essentially of reinforcing fibers in a vitroceramic matrix, which vitroceramic matrix consists essentially of triclinic anorthite and monoclinic celsian.

* * * * *

UNITED STATES PATENT AND TRADEMARK OFFICE
CERTIFICATE OF CORRECTION

PATENT NO. : 6,034,012

DATED : March 7, 2000

INVENTOR(S): Gérard Philippe GAUTHIER, et al.

It is certified that an error appears in the above-identified patent and that said Letters Patent is hereby corrected as shown below:

Column 3, line 4, "a which" should read --α which--.

Column 4, line 43, "coefficient a" should read --coefficient α--.

Signed and Sealed this

Seventeenth Day of April, 2001

*Attest:*

NICHOLAS P. GODICI

*Attesting Officer*     *Acting Director of the United States Patent and Trademark Office*